United States Patent Office 2,926,988
Patented Mar. 1, 1960

2,926,988

POPPED VOLCANIC ASH COVER FOR LIQUIDS

James R. Hurley, Bartlesville, Okla., assignor to Phillips Petroleum Company, a corporation of Delaware No Drawing. Application February 21, 1955
Serial No. 489,733

2 Claims. (Cl. 21—60.5)

This invention relates to popped volcanic ash as a cover for liquids. In one of its aspects the invention relates to the use of popped volcanic ash as a cover for liquids which are ordinarily lost by evaporation. In another of its aspects it relates to the use of popped volcanic ash as a protective cover for liquids to prevent these against contamination by air or materials which may be floating in the air. In another aspect of the invention it relates to the segregation from popped volcanic ash of a floating portion by floating the volcanic ash upon a portion of the liquid which is to be protected and allowing a non-floating portion to be separated therefrom by sinking through the liquid. In another aspect of the invention the popped volcanic ash is merely directly floated upon the liquid to be protected in case the non-floating portion of the popped volcanic ash is not detrimental to the liquid. In a still further aspect of the invention popped volcanic ash is floated upon a salt water pit to prevent air from being dissolved into the salt water, thus reducing substantially the corrosion of equipment used to pump the salt water to a place of utilization. In a still further aspect of the invention it relates to elutriation of popped volcanic ash by screening or other methods to select therefrom a particularly suitable fraction of material for one or more of the uses according to the invention. In a further aspect, still, the invention relates to the improvement of the ability of a popped volcanic ash to undergo segregation to separate from it particles which do not float by subjecting said ash to at least one treatment which comprises placing it under a reduced pressure.

A method of converting volcanic ash to cellular particles or so-called popped volcanic ash is described in Patent 2,637,702 of May 5, 1953.

Vapor loss from volatile liquids in open tanks or other tanks and containers that are not vapor tight has been a problem for a great many years. Various attacks upon the problem have yielded varying degrees of success. However, in most instances the storage of a liquid while preventing substantial losses therefrom by evaporation has been an expensive matter. The same observation is made with respect to the storage of liquids in containers which in effect are open pits of vast surface area and which, therefore, require expensive covers to prevent the stored liquids from becoming contaminated by the oxygen of the air or other materials in the air which are undesirable in the said liquids. Thus, floating roofs have been used on tanks to reduce the vapor loss. Also, extensive vapor recovery systems have been installed. More recently it has been suggested that small plastic balloons which are so small that they are referred to as microballoons be employed to cut down on loss by evaporation from storage tanks.

I have now found that popped volcanic ash can be floated upon liquids, especially hydrocarbon liquids, which are stored in vessels which are not vapor tight. The small particles of popped volcanic ash can be distributed over the surface of the liquids, thus considerably reducing their vapor pressure.

Therefore, according to this invention, there is provided a method for covering a liquid surface which comprises floating thereon popped volcanic ash.

Ordinarily, popped volcanic ash, as prepared, will not float 100 percent upon a liquid such as a hydrocarbon. There will be particles, especially the smaller particles, which for purposes of this invention may be termed "insufficiently popped," which will not float on the liquid. In one form of the invention, the popped volcanic ash is floated upon the liquid and particles which will not float are allowed to fall to the bottom of the container and can be recovered, although this method of operation is not preferred. In a preferred method of operation, according to the invention, the popped volcanic ash is floated upon a portion of the liquid to be protected or upon a liquid which is similar to the liquid to be protected in the sense that the segregation of the non-floating particles, that is particles which will not float upon the liquid to be protected, is thus accomplished.

It is noteworthy that various methods of segregating the desirable from the undesirable particles will be apparent to one skilled in the art in possession of this disclosure. Therefore, this disclosure does not exhaustively mention all the various methods which can be applied within the scope of the invention to segregate the desirable from the undesirable particles of the popped volcanic ash.

Another method of separating the desirable from the undesirable particles of volcanic ash is mechanical in character in the sense that a screening of the popped volcanic ash, as produced, is effected to retain on the screen only those particles which are of size sufficient, and, therefore, of sufficiently low density, to float upon the liquid it is desired to protect.

The thickness of the layer of popped volcanic ash which can be floated upon the surface of the stored liquid for reducing vapor loss or for protecting the liquid from contamination by air need be only thick enough to completely cover the surface of the liquid. However, it is possible to use thicknesses of up to an inch or greater.

Since the invention is preeminently suited for the protection of crude oil in storage, it will now be exemplified in connection with such an application. However, it is possible within the scope of the invention to use popped volcanic ash upon any liquid where there is involved a problem of protecting the liquid either against loss by evaporation or by contamination by the air or materials floating in the air, or against heat, fire hazard, etc.

*Example I*

Two, 200 ml. samples of Wafra No. 4 crude were placed in an oven at 135° F. One of the samples was covered with a floating layer of popped volcanic ash approximately one inch thick, the other was left uncovered. Periodic checks were made for evaporation loss. The results of the test appear below.

| Time, hours | Volume of liquid lost, percent | |
|---|---|---|
| | Without popped ash | With popped ash |
| 1.25 | 0.9 | 0.3 |
| 5.75 | 3.5 | 1.0 |
| 16.7 | 5.8 | 1.8 |
| 21.8 | 6.5 | 2.1 |
| 25.3 | 6.8 | 2.3 |
| 44.0 | 8.4 | 3.1 |
| 88.5 | 10.2 | 4.4 |
| 121.0 | 11.0 | 5.5 |
| 258.0 | 14.4 | 9.7 |

At the end of the test described above, only about 25 percent of the popped ash remained as a floating layer while the rest had sunk. Thus, according to this invention, and as an important feature thereof, only a small fraction of the popped ash consists of imperforate cells which will float indefinitely. This was verified by tests in which 10 grams of ash were suspended in each of water, toluene (32° API), and iso-octane (73° API). After 552 hr. (equilibrium essentially reached by intermittent agitation), there remained 26 ml. of stable foam on water, 9 ml. on toluene, and 6 ml. on iso-octane whereas initially the foam volume was about 75 ml.

Tests also showed that when a slurry of the popped ash was subjected several times to a vacuum and then to air at atmospheric pressure, equilibrium was attained in a few minutes.

It will be noted from the foregoing example and tests that the invention is suited to the covering of various types of liquids, organic and inorganic in character. Further, it will be understood that another important feature of the invention is the treatment of the volcanic ash to successive pressure changes as in the last-described tests. Thus, it is within the scope of the invention to subject the popped volcanic ash to a vacuum and then to atmospheric pressure in order to improve its ability to segregate when placed upon the liquid.

*Example II*

Ten grams of the ash were added to 200 ml. of water in a graduate, shaken, and allowed to stand. Within 60 seconds, nearly all of the popped ash had floated to the top and at the end of three minutes the mat had formed so firmly that the cylinder could be inverted and shaken without spilling any water.

Reasonable variation and modification are possible within the scope of the foregoing disclosure and the appended claims to the invention, the essence of which is that popped volcanic ash has been found useful for the covering of liquids, as described, and that certain preferred methods for treatment of the popped volcanic ash to render it even more useful by eliminating from it certain non-floating portions have been set forth, also as described.

I claim:
1. A method for protecting a liquid against loss of volatile components thereof to the atmosphere or its contamination by said atmosphere which comprises subjecting popped volcanic ash to a reduced pressure, then floating said popped volcanic ash upon a separate body of said liquid, allowing non-floating portions of the volcanic ash to separate from the remainder of the ash floating upon the surface of the said separate body of liquid recovering said remainder of ash from said separate body of liquid and then floating the said remainder of volcanic ash upon the remainder of said liquid in a quantity sufficient to substantially completely cover said liquid.

2. A method for storing an organic liquid which tends to lose its volatile components during storage which comprises subjecting popped volcanic ash to a reduced pressure, floating the popped volcanic ash upon a separate body of said liquid to allow the non-floating portion of said popped volcanic ash to separate from the floating portion of said popped volcanic ash and then floating said floating portion of said popped volcanic ash upon said organic liquid in a manner to substantially completely cover the same with a layer of floating popped volcanic ash, the subjecting to said reduced pressure improving the covering characteristics of the thus-treated popped volcanic ash.

References Cited in the file of this patent

UNITED STATES PATENTS

| 1,415,351 | Howard | May 9, 1922 |
| 1,814,053 | Mueller | July 14, 1931 |
| 2,637,702 | Burwell | May 5, 1953 |
| 2,797,138 | Veatch | June 25, 1957 |
| 2,797,139 | Veatch | June 25, 1957 |
| 2,797,140 | Veatch | June 25, 1957 |
| 2,797,141 | Veatch | June 25, 1957 |

FOREIGN PATENTS

| 448,801 | Germany | Sept. 26, 1928 |
| 13,780 | Australia | Dec. 18, 1928 |
| 520,191 | Belgium | June 15, 1953 |